United States Patent [19]

Furukawa

[11] Patent Number: 5,315,578

[45] Date of Patent: May 24, 1994

[54] DISC RECORDING MEDIUM AND DATA RECORDING METHOD

[75] Inventor: Masamichi Furukawa, Hamamatsu, Japan

[73] Assignee: Yamaha Corporation, Hamamatsu, Japan

[21] Appl. No.: 879,771

[22] Filed: May 6, 1992

[30] Foreign Application Priority Data

May 7, 1991 [JP] Japan .................. 3-131782

[51] Int. Cl.⁵ .................................. G11B 7/00
[52] U.S. Cl. .................. 369/275.3; 369/275.2; 369/44.31
[58] Field of Search .............. 369/44.27, 44.31, 43, 369/272, 275.1, 275.2, 275.3, 275.4, 276; 360/97.01

[56] References Cited

U.S. PATENT DOCUMENTS 4,142,209  2/1979  Hedlund et al. ............... 369/44.27

Primary Examiner—Paul M. Dzierzynski
Assistant Examiner—Don Wong
Attorney, Agent, or Firm—Spensley Horn Jubas & Lubitz

[57] ABSTRACT

In a disc recording medium such as a Compact Disc capable of preventing occurrence of a burst error due to a scratch or a black spot on a disc in which the same data is repeatedly recorded for error correction, at least one adjusting section is inserted in an interval between repeatedly recorded same data. The length of the adjusting section is set to a value at which the same frames of at least two same data are not located in parallel to each other. Occurrence of a scratch will not prevent reading of the frame in at least one of the data.

21 Claims, 4 Drawing Sheets

DISC RECORDING MEDIUM AND DATA RECORDING METHOD

BACKGROUND OF THE INVENTION

This invention relates to a disc recording medium including an optical disc, magnetic disc, opticomagnetic disc, electrostatic disc, mechanical type disc or the like disc type recording medium for digital signal recording and, more particularly, to a disc recording medium capable of preventing occurrence of a burst error due to a scratch and dust on a disc in which data is repeatedly recorded for correction or compensation of an error when the disc is reproduced.

In recording formats used for a disc recording medium, there is a recording format according to which the same data is continuously recorded twice to ensure that one data can be read even when the other data cannot be read during reproduction of data from a disc and thereby enable correction or compensation of an error. For example, as shown in FIG. 2a, the first recording of the data starts at 110 and ends at 112. The second recording of the data starts at 112 and ends at 114.

In recording the same data twice on a CLV (constant linear velocity) type disc, there will arise a case where, as shown in FIG. 2A, first occurring data 4 and second occurring data which are of the same data are located in parallel to each other in their circumferential direction of a disc 12. In other words, the same data are located at tracks adjacent to each other. For example, the first frame recorded for the first time 116 and the first frame recorded for the second time 118 are in parallel with each other. If there occurs a scratch (or deposition of a foreign matter such as a black spot) 2 over the tracks on which the same data 4, 5 are respectively recorded on the disc 12, failure in reading of data will occur notwithstanding that the same data is written twice whereby a burst error occurs in a reproduced signal.

For preventing occurrence of such burst error, it is necessary to hold the length on the recording tracks for one of these occurring data below one circumference of the disc. For this purpose, a conventional data format is so made that, as shown in FIG. 2B, one data is divided to plural frames and respective divided frames are recorded twice. This conventional format, however, requires twice as long as undivided data for reading of one series of data frames with the result that the speed of reading of data becomes low. For example, the first frame of data recorded for the first time 120 is recorded after the start of the data 110. Immediately following the first frame of data recorded for the first time 120 is the first frame of data recorded for the second time 122. Following this is the next frame of data recorded for the first time 124 followed by the next frame of data recorded for the second time 126. This process continues until the last frame is recorded for the first time 128 followed by the last frame being recorded for the second time 130 at the end of the data 114.

It is, therefore, an object of the invention to provide a disc recording medium capable of preventing occurrence of a burst error due to a scratch on the digital recording disc in which data is repeatedly recorded for correction of or compensation for an error and also capable of reading data at a high speed.

SUMMARY OF THE INVENTION

For achieving the above described object of the invention, there is provided a disc recording medium having data recorded concentrically or spirally and same data being recorded plural times repeatedly for preventing data reproduction from an error, at least a portion of subsequently occurring data of the repeatedly recorded same data having possibility of appearing at a position ahead of one circumference of the disc recording medium, wherein the improvement comprises at least one adjusting section being inserted in an interval between the repeatedly recorded same data, length of the adjusting section being set to a value at which the same portions of at least two same data of the repeatedly recorded same data are not located in parallel to each other.

A location of this preferred embodiment is illustrated in FIG. 3a, where a line (150) passing through portions (4, 5) of the same data is shown to be oblique to the position of a portion of the repeatedly recorded same data. Other example illustration showing a line passing through a portion (4) of the same data oblique to portions (5, 6) can be seen in FIG. 3b.

Since, according to the invention, at least one adjusting section is inserted in an interval between the repeatedly recorded same data and the length of the adjusting section is set to a value at which the same portions of at least two same data of the repeatedly recorded same data are not located in parallel to each other on the same circumference, possibility that none of the same data can be read due to a scratch or a black spot on the disc will be eliminated. Besides, according to the invention, it is not necessary to divide data to pieces and record the divided data repeatedly and separately as in the conventional data format shown in FIG. 2B, reading of a series of data can be achieved at a higher speed.

According to one aspect of the invention, there is provided a disc recording method for recording data in a disc type recording region substantially circularly about the center of a disc comprising the steps of forming hypothetically a first closed sector by connecting the center of the disc, a start point of recording of first data to be recorded in the recording region of the disc and an end point of recording of the first data to one another, and a second closed sector by connecting the center of the disc, a start point of recording of second data which is of the same data as the first data and is to be recorded with the first data in the recording region of the disc and an end point of recording of the second data to one another, and recording the first data and the second data in the recording region of the disc in such a manner that the first closed sector and the second closed sector will not overlap each other.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
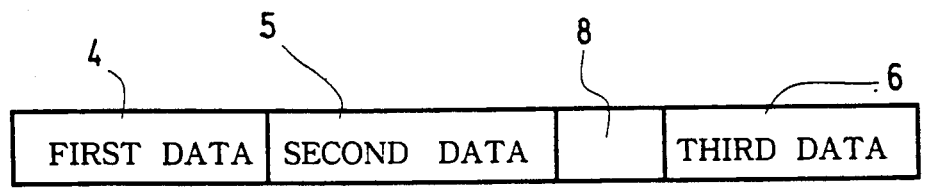
FIG. 1 is a data format of the first embodiment of the invention.

An embodiment of the invention will now be described. In this embodiment, the invention is applied to recording of character data on a Compact Disc as described in U.S. Ser. No. 07/718,551 on an invention entitled "Display Device for a Compact Disc player and a Compact Disc" assigned to the same assignee of the present invention. According to the device and CD, some specific mode, e.g., Mode 5, is newly defined as Q-channel subcoding data of a program region of a Compact Disc and specific information including character code information representing contents of a recorded music (such as disc title, music title, name of composer or performer) and editing information is recorded with an identifying code as the Q-channel data. In the Compact Disc player, specific information consisting of the character code concerning the contents of the music is identified by the identifying code imparted to the specific information from the Q-channel data read out during the reproduction mode and then delivered out. This identified specific information is sorted into character code information and editing information, this character code information is edited by the editing information as a displayable character code train and supplied to a display unit for display.

In a case where such new character data is recorded in Q-channel subcoding, the Q-subcoding of an existing modes (e.g., time information of the Mode 1) must also be recorded and, accordingly, the new mode data is inserted between the existing mode data for recording. Therefore, one frame of character information of the new mode is inserted, for example, every ten frames (reproducing time for one frame being 1/75 seconds).

According to the display of contents of music by the above described new mode (mode 5), data amount of one line to be recorded is mostly about 5 frames. Therefore, in character data displayed in Mode 5, display data for one line is read from a Compact Disc by 10×5 frames. In this case, length L of this data of one line on the disc becomes $$L = 1.2 \text{ m/sec} \times (1/75) \text{ sec} \times (10 \times 5) \text{ frames} = 800 \text{ mm}$$

where 1.2 m/sec represents the linear velocity for reproducing a Compact Disc.

On the other hand, length L0 of the innermost circumference of a recording portion of a 12 cm Compact Disc is $$L0 = 3.14 \times 50 \text{ mm} = 157 \text{ mm}$$

where 3.14 is the ratio of the circumference of a circle to its diameter and 50 mm is the diameter at the innermost circumference.

Accordingly, L/L0 is about 5.1 so that data of one line is recorded over about 5.1 circumferences of the disc, assuming that the gap between respective tracks is very narrow and the respective circumferences in the inner portion of the disc are the same as the innermost circumference. When, therefore, data of one line is repeatedly recorded, data which is recorded for the second time (hereinafter referred to as "second data") is recorded, as viewed from the innermost circumference of the disc, at a position which is slightly ahead of data which is recorded for the first time (hereinafter referred to as "first data") in the circumferential direction. A difference in the recording position in the circumferential direction between the first data and the second data is reduced toward the outermost circumference of the disc and the first data is located in parallel to second data in the circumferential direction at a position where the diameter of the disc is about 50.96, i.e., 800 mm÷5 frames÷3.14=50.96 mm.

Occurrence of a scratch or a black spot in the order of 0.1 mm on a disc is inevitable. This magnitude of a scratch or a black spot ranges over 60 tracks or more and, therefore, in a case where such scratch or black spot occurs at a postion where first data is located in parallel to the second data in the circumferential direction, there is high possibility that when the first data cannot be read due to the scratch or black spot, the second data cannot be read either.

Embodiments of the invention which can prevent such inconvenience will be described below.

EMBODIMENT 1

In this embodiment 1, the same data (data for one line of character information of Mode 5) is recorded in the CLV system spirally or concentrically for three times repeatedly on a 12 cm Compact Disc as shown in FIG. 1 (in FIG. 1, illustration of frames other than Mode 5 is omitted for convenience of description) and an adjusting section 8 of a fixed length is inserted for recording between second data 5 and third data 6. The adjusting secition 8 may alternatively be inserted between first data 4 and the second data 5. Further, adusting sections 8 of different lengths may be inserted both between the first data 4 and the second data 5 and between the second data 5 and the third data 6. In this adjusting section 8, special data (e.g., data representing space (blank)) indicating that this section is the adjusting section may be recorded.

Figure 3A:
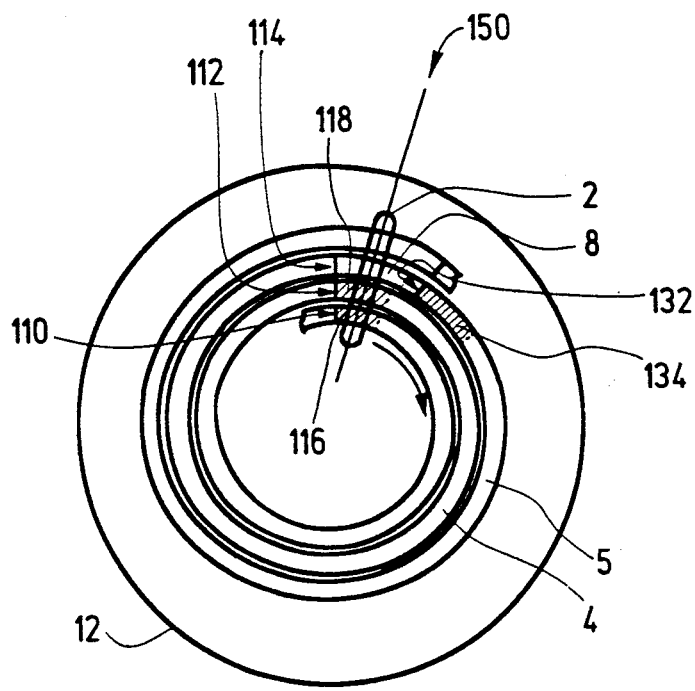
FIGS. 3A and 3B are diagrams showing states of recording on discs according to the data format of FIG. 1.
Figure 3B:
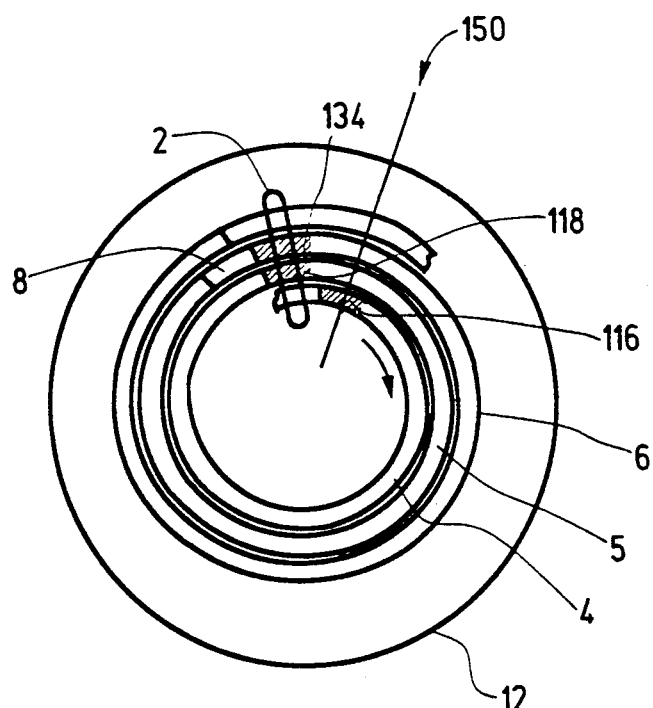

States of recording on discs according to the data format of FIG. 1 are shown in FIGS. 3a and 3b. For reproducing data correctly, data must be read in a complete form at least once per each unit of the error correction or compensation or check group (every frame (=1/75 seconds) in the case of a Compact Disc).

FIG. 3A shows a case where first data 4 and second data 5 are located in parallel to each other in the circumferential direction at a certain radial direction of a disc 12. For example, the first recording of the data starts at 110 and end at 112. The second recording of the data starts at 112 and ends at 114. The first frame recorded for the first time 116 and the first frame recorded for the second time 118 are recorded in parallel with each other. However, in this case, third data 6 is not located side by side to the first and second data 4 and 5 owing to the provision of the adusting section 8. An adjusting section 8 is inserted after the end of the second data 114 before the start of the third recording of the data 132, which causes the first frame recorded for the third time 134 to be non-parallel to the first frames recorded 116 and 118. Therefore, by setting the length of the adjusting section 8 to length of one unit of an error correction or compensation or check group (reproduction time for one frame is 1/75 second and its data length is about 16 mm) in the case of a Compact Disc) plus length in the circumferential direction of an expected burst error, ocurrence of a scratch 2 will not prevent reading of data of the same frame in the third data 6 even if the data of the same frame cannot be read in the data 4 and 5. Also, when the third data 6 cannot be read, the data of the same frame can be read in the first and second data 4 and 5.

FIG. 3B shows a case where the second data 5 and the third data 6 are located in parallel in the circumferential direction at a different radial direction of the disc 12. In this case, the first data 4 is not located in parallel to the second and third data 5 and 6 (i.e., the first frames recorded 134 and 118 are in parallel with each other, but not with the first frame recorded for the first time 116). When, therefore, the second and third data 5 and 6 of the first frame cannot be read due to the scratch 2, the data of the same frame can be read in the first data 4. Conversely, when the first data 4 cannot be read, the data of the same frame can be read in the second and third data 5 and 6. As a result of simulation tests, it has been found that a proper length of the adjsuting section 8 is four or five frames of the subcoding frame.

As described above, according to the format of FIG. 1, at least one data can be read every frame even when the length of the adjusting seciton 8 is fixed. The length of the adusting section 8 can also be made variable with the position of the adusting section in the radial direction.

When character data for one line of display in the Mode 5 requires data amount of five frames, one frame of this character data is inserted every 10 frames, and data for completing the one line character data is recorded three times repeatedly, recording length of three times data is ten seconds, i.e., 5 frames × 10 frames × 3 times × 1/75 seconds = 2 seconds.

Figure 2A:
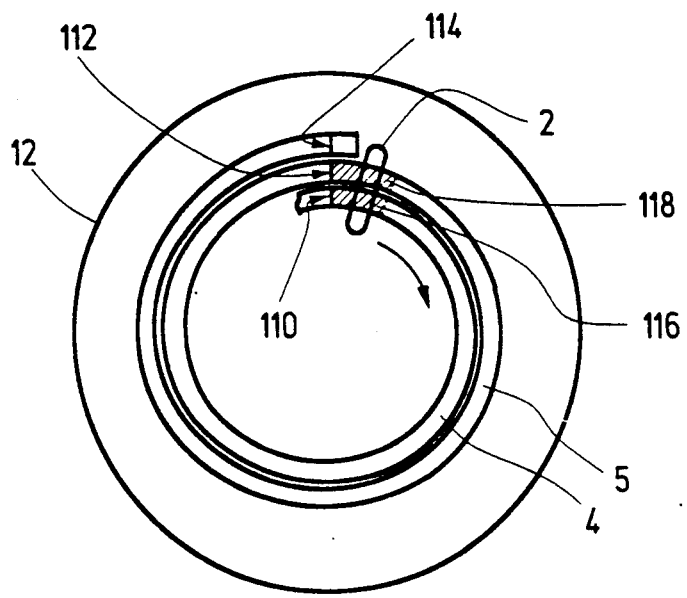
FIGS. 2A and 2B are diagrams showing states of recording on discs according to the conventional data formats according to which the same data is recorded twice.
Figure 2B:
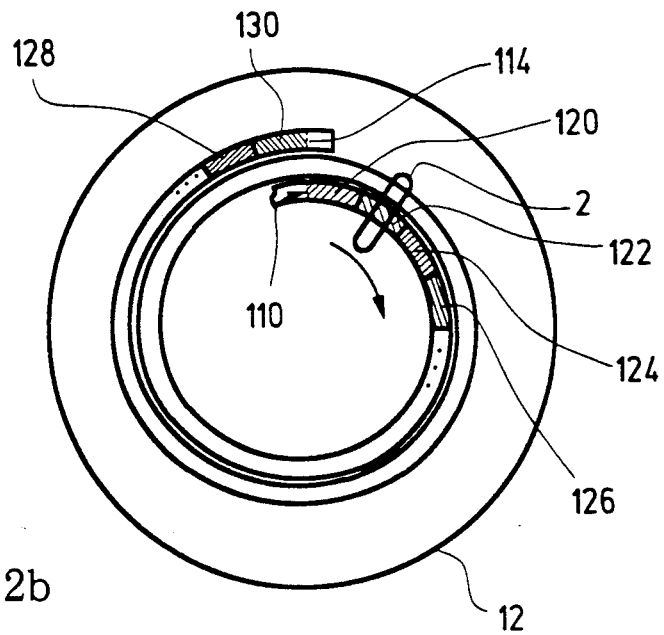

In the case of the conventional data format shown in FIG. 2B where data is divided into pieces and data which is of the same frames are collected and recorded three times repeatedly, this time length of 2 seconds is always required before reading of character data for one line is completed regardless of presence or absence of an burst error. In contrast, according to the data format of FIG. 1, when all frames of the first data 4 has been read correctly, reading of data for one line has been completed, so that it only takes about 0.67 second, i.e., 2 seconds ÷ 3 = 0.67 seconds. Thus, a high speed reading of data is usually realized.

Assuming that an average block error rate of a disc is 1.5% (according to the current Compact Disc performance), probability of occurrence of an error in one subcoding frame is as follows. In data of a Compact Disc, one block consists of 32 symbols and one symbol consists of 8 bits. As the Q subcoding frame, 96 frames are normally collected.

(symbol error rate) = $(1.5 \times 10^{-2}) \div 32$ (bit error rate) = (symbol error rate) ÷ 8

(Q-subcoding frame error rate) = (bit error rate) × 96 = 0.56% = 1/178

Thus, the probability of occurrence of error is once every 178 frames and, therefore, most data can be read from the first data 4. Since data for one line is recorded in 5 frames, probability of occurrence of an error in any frame of data for one line is (0.56 × 5 = 2.8%), that is once every 35 times, so that in most cases, character information for one line can be expressed by the first data 4.

Figure 4:
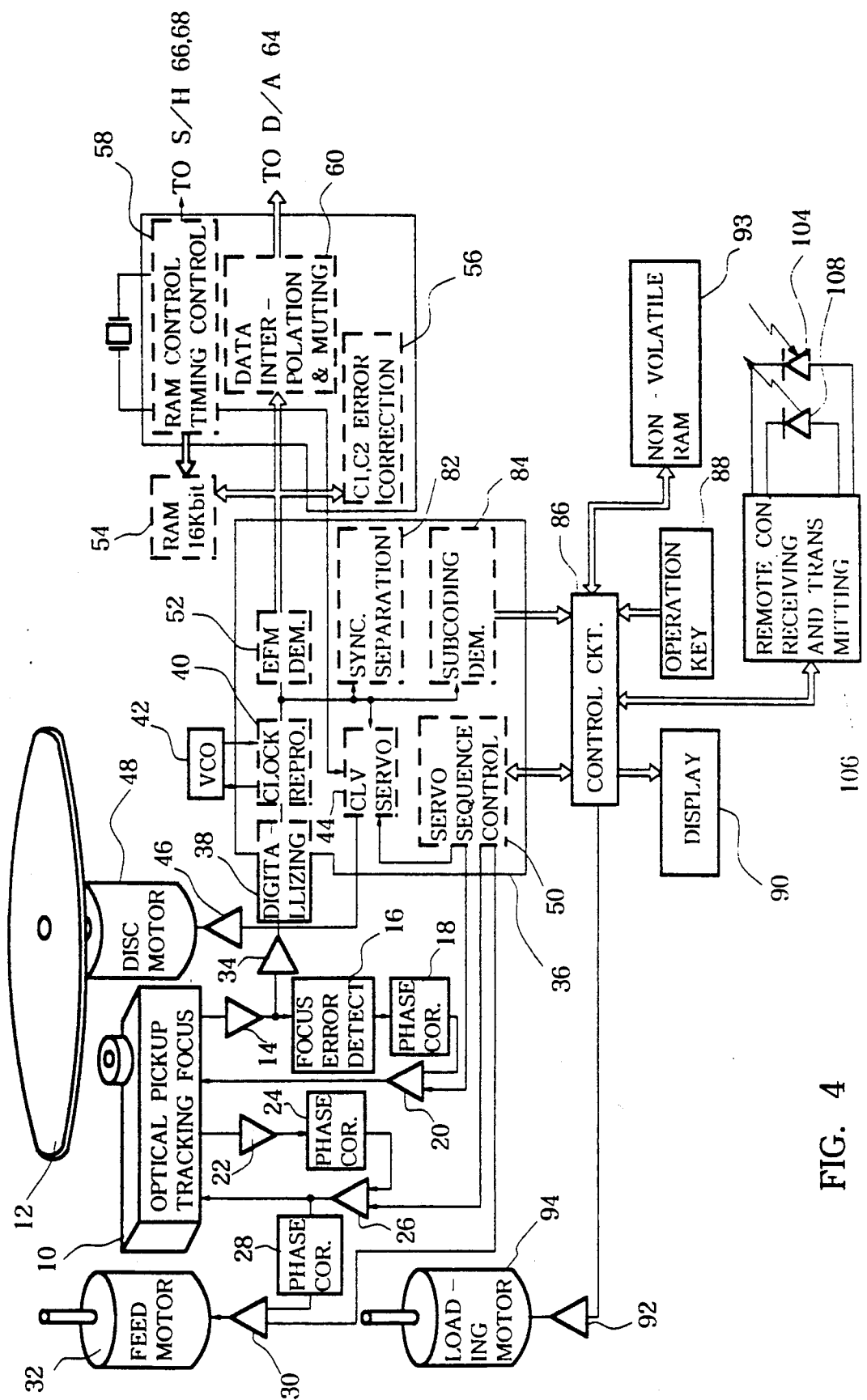
FIG. 4 is a block diagram showing an example of a Compact Disc playback device for playing back a Compact Disc having the data format of FIG. 1.

An example of a Compact Disc player for playing back a Compact Disc having the data format of FIG. 1 is shown in FIG. 4.

In FIG. 4, an optical pickup 10 irradiates a laser beam on a Compact Disc (hereinafter referred to as "disc") 12 and receives a reflected beam therefrom. A received beam signal is applied to a focus error detection circuit 16 through a preamplifier 14 and a focus error is detected by the circuit 16. The focus error signal is supplied to a focus actuator in the optical pickup 10 through a phase correction circuit 18 and a drive amplifier 20 and a focus adjusting control is made by a focus servo.

A tracking error signal is supplied to a tracking actuator in the optical pickup 10 through a preamplifier 22, a phase correction circuit 24 and drive amplifier 26 whereby a tracking control is made by a tracking servo.

The tracking error signal from the drive amplifier 26 is also supplied to a feed motor 32 through a phase correction circuit 28 and a drive amplifier 30 and a feed control is made by a feed servo.

A record signal (HF signal) which has been detected by the optical pickup is applied to a digital IC 36 through an HF amplifier 34. In the digital IC 36, the HF signal is rectified in wave by a digitallizing circuit 38 for enabling subsequent digital processing and thereafter is compared by a clock reproduction circuit 40 with a reference frequency from a VCO 42. Output of the circuit 40 which represents result of comparison is supplied to a disc motor 48 through a CLV servo circuit 44 and a drive amplifier 46 for controlling the disc motor 48 and thereby controlling the disc 12 at a constant linear velocity.

A servo sequence controller 50 sequence-controls the focus servo, tracking servo, feed servo and disc rotation servo.

A signal reproduced from the disc 12 (hereinafter referred to as "reproduced signal") is EFM-demodulated by an EFM demodulation circuit 52 and thereafter is stored once in a RAM 54. C1, C2 error correction of the reproduced signal is made by an error correction circuit 56 and thereafter data of the reproduced signal is read out sequentially at an accurate period by a RAM control timing control circuit 58. The read out data is subjected to data interpolation and data muting, if necessary, by a data interpolation and muting circuit 60. The output of the circuit 60 is converted to an analog signal by a digital-to-analog converter (not shown) and thereafter is distributed to left and right channels by sample and hold circuits (not shown). Thereafter, left and right channel audio signals are supplied from output terminals through low-pass filters and amplifiers.

A synchronizing signal separation circuit 82 separates a synchronizing signal from the reproduced signal and a subcoding demodulation circuit 84 demodulates a subcoding from the reproduced signal. As described previously, since the character code information recorded in the subcoding of Mode 5 is recorded three times repeatedly, first the subcoding demodulation circuit 84 stores and holds a frame which has been read from the first data 4. When there is a frame which has not been read from the first data 4, the circuit 84 reads this frame from the second data 5 or from the third data 6 and then stores and holds the read frame. When all frames have been read from the first data 4, reading of data for one line is completed at the end of the first data 4.

A control circuit 86 controls the respective circuits in accordance with operations of an operation key 88 and a remote controller by a user and causes a display 94 to display information based on the demodulated subcoding. The control circuit 86 also causes a drive amplifier 92 to drive a loading motor 94 to control loading of a disc tray (not shown).

The Compact Disc player has an infrared receiving section 104 which receives the infrared signal from a remote controller (not shown) and supplies the received signal to the control circuit 86 through a remote controller receiving and transmitting section 106 for implementation of the commanded function.

Display information reproduced by the Compact Disc player is supplied to the remote controller receiving and transmitting section 106 and transmitted from the infrared projection section 108. This infrared signal is received by an infrared receiving section of the remote controller 96 and displayed on a display of the remote controller.

A RAM 93 stores display information based on the Q-channel subcoding of Mode 1 and Mode 5 reproduced from the disc 12. The display information is read from the non-volatile RAM 93 by operation of the operation key 88 of the Compact Disc player or a operation key of the remote controller and utilized for various purposes including retrieval and display of the reproduced position on the disc 12.

EMBODIMENT 2

Figure 5:
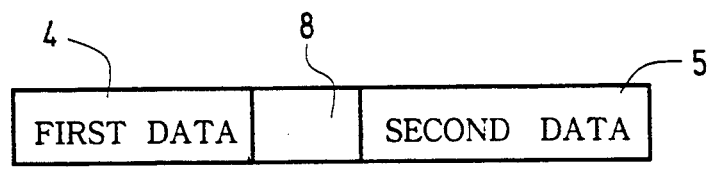
FIG. 5 is a data format of the second embodiment of the invention.
Figure 6:
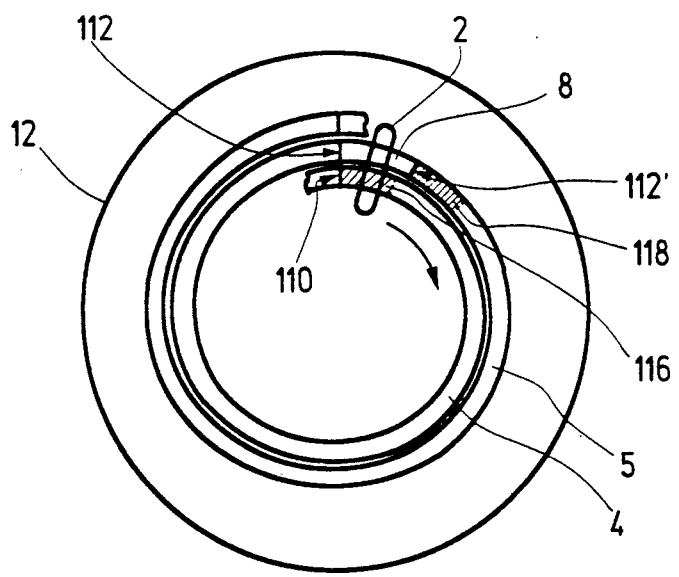
FIG. 6 is a diagram showing a state of recording on a disc according to the data format of FIG. 5.

In the above described embodiment 1, the same data (data for one display line) is written three times. An embodiment in which the same effect can be obtained with writing of the same data twice is shown in FIG. 5. In this embodiment, the adjusting seciton 8 is inserted between the first data 4 and the second data 5. This adjusting section 8 may be inserted only at a necessary position in the radial direction of the disc 12 or the length of the adjusting section 8 may be made variable with the position of the adjusting section in the radial direction of the disc 12 so that the first data 4 and the second data 5 will not be located in parallel to each other in the circumferential direction at any position in the radial direction of the disc 12 (i.e., there will be a difference between the first data 4 and the second data 5 in the circumferential direction exceeding length of one unit of an error correction or compensation or check group plus length in the circumferential direction of an expected burst error). According to this embodiment, even when there is a scratch 2 on the disc 12 as shown in FIG. 6, there is no possibility that any frame data cannot be read in either of the first and second data 4 and 5. For example, the first recording of the data starts at 110 and ends at 112. Next, an adjusting section 8 is recorded between the first recording end 112 and the start of the second recording of the data 112'. Therefore, the first frame recorded for the first time 116 is not in parallel with the first frame recorded for the second time 118.

Since the same data has only to be repeated twice in the embodiment 2, recording length for expressing data for one line can be shortened as compared with the embodiment 1 in which the same data is repeated three times so that more character information can be recorded.

Necessary length of the adjusting section 8 can be obtained depending upon the position of the adjusting section 8 in the radial direction of the disc 12 (=absolute time), using as a constant length of data for one recording time, length of an error correction, compensation or check group and length of an expected burst error. The disc recording device can record the adjusting section 8 by automatically obtaining this length in accordance with the position of the adjusting section 8 in the radial direction of the disc 12 or absolute time.

In the above described embodiments, the same data is recorded twice or three times repeatedly. The invention is applicable also to a case where the same data is recorded four or more times repeatedly.

The above description has been made about a case where the invention is applied to a Compact Disc. The invention is applicable also to various other discs including an optical disc, magnetic disc, opticomagnetic disc, electrostatic disc and mechanical type disc.

What is claimed is:

1. A disc recording medium having first data recorded thereon and having second data, consisting substantially of the same data as the first data, recorded at least a second time thereon for preventing data reproduction of an error, at least a portion of said second data having a possibility of appearing at a position ahead of at least a corresponding portion of said first data, the disc recording medium including at least one adjusting section inserted in an interval between said first and second data, wherein the length of the adjusting section is set in accordance with a value such that a portion of the second data is not located in parallel to the corresponding portion of the first data relative to a radial direction of the disc recording medium.

2. A disc recording medium as defined in claim 1 wherein the length of the adjusting section is set to length of one unit of an error correction plus length in the circumferential direction of an expected burst error.

3. A disc recording medium as defined in claim 1 wherein the length of the adjusting section is fixed regardless of the position of the adjusting section in the radial direction.

4. A disc recording medium as defined in claim 1 wherein the length of the adjusting section is variable with the position of the adjusting section in the radial direction.

5. A disc recording medium as defined in claim 1 further having the first data track recorded concentrically.

6. A disc recording medium as defined in claim 1 further having the first data track recorded spirally.

7. A disc recording medium having a data recording region and being capable of having data recorded in the data recording region reproduced by turning the disc recording medium, the disc recording medium comprising:

a plurality of same data successively recorded in the data recording region, a number of the same data being at least two; and adjusting data having a predetermined data length in the data recording region and being recorded among the plural same data, the predetermined data length being so set that at least two of the same data are located at a position non-parallel from each other in a radial direction of the disc recording medium.

8. A disc recording medium as defined in claim 7 wherein the data of the data recording region is recorded concentrically on the disc recording medium.

9. A disc recording medium as defined in claim 7 wherein the data of the data recording region is recorded spirally on the disc recording medium.

10. A disc recording medium having a region for recording portions of reproducible data, the disc recording medium comprising a plurality of spaced apart data tracks for recording the portions of the reproducible data, each portion of the reproducible data being recorded at least twice on the plurality of spaced apart data tracks, wherein a first recording of each portion of the reproducible data is recorded at a position on a first data track, and wherein a second recording of each corresponding portion of the reproducible data is recorded at a position on a data track other than the first data track such that a line lying along the radial direction of the disc recording medium and passing through the position of the first recording of each portion of the reproducible data on the first data track is oblique to the position of the corresponding second recording of data recorded on the other data track.

11. A disc recording medium according to claim 10, wherein the plurality of spaced apart data tracks are spirally positioned on the disc recording medium.

12. A disc recording medium according to claim 10, wherein the plurality of spaced apart data tracks are concentrically positioned on the disc recording medium.

13. A disc recording medium according to claim 10, wherein each second recording of the reproducible data includes at least one adjusting portion and wherein the oblique position of the second recorded reproducible data is achieved by inserting the at least one adjusting portion before each second recording of the corresponding portion of the reproducible data.

14. A disc recording medium according to claim 13, wherein a length of the at least one adjusting portion is set to a length of one unit of an error correction length in a circumferential direction of an expected burst error.

15. A disc recording medium according to claim 13, wherein a length of the at least one adjusting portion is fixed regardless of which of the plurality of spaced apart tracks the at least one adjusting portion is recorded on.

16. A disc recording medium according to claim 13, wherein a length of the at least one adjusting portion is variable and dependent on which of the plurality of spaced apart tracks the at least one adjusting portion is recorded on.

17. A method of recording portions of reproducible data on a disc recording medium having a region for recording reproducible data, the recording region including a plurality of spaced apart data tracks for recording the reproducible data, the method comprising the steps of:

recording the reproducible data onto a first data track having a plurality of recording portions; and recording the same reproducible data as recorded on the first data track onto a second data track having recording portions corresponding to the recording portions of the first data track and being located relative to the first data track such that a line lying along the radial direction of the disc recording medium and passing through one of the plurality recording portions of the first data track is oblique to the corresponding recording portions of the second data track which contains the same data as recorded on the first data track.

18. A method according to claim 17, further comprising the step of inserting at least one adjusting portion positionally before the recording portions of the second data track to achieve the oblique position of the recording portions of the second data track.

19. A method according to claim 18, further comprising the step of setting a length of the at least one adjusting portion to a length of one unit of an error correction length in a circumferential direction of an expected burst error.

20. A method according to claim 18, further comprising the step of fixing a length of the at least one adjusting portion to be the same length regardless of which of the plurality of spaced apart tracks the at least one adjusting portion is recorded on.

21. A method according to claim 18, further comprising the step of varying a length of the at least one adjusting portion to depend on which of the plurality of spaced apart tracks the at least one adjusting portion is recorded on.

* * * * *